G. F. LONG.
FLEXIBLE SHAFT.
APPLICATION FILED AUG. 16, 1912. RENEWED MAY 8, 1917.
1,259,642.
Patented Mar. 19, 1918.
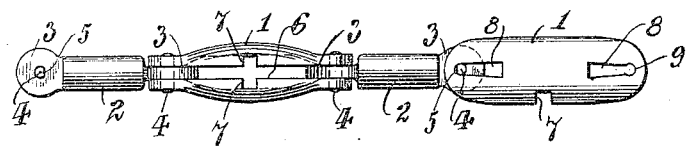
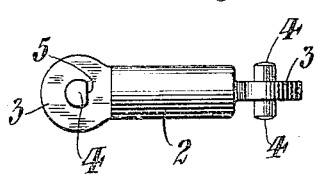 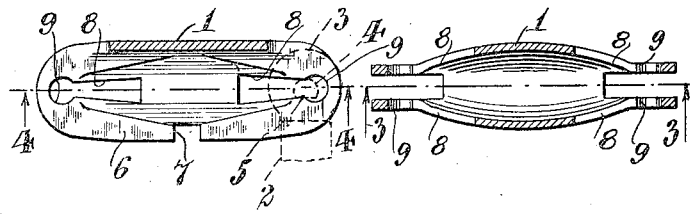
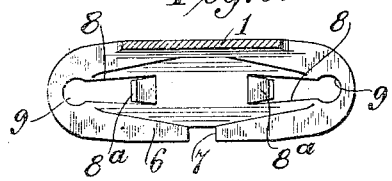 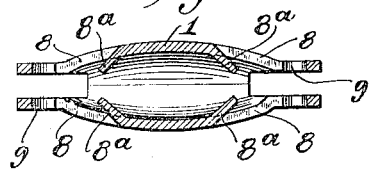
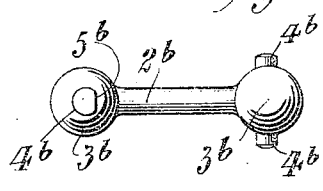 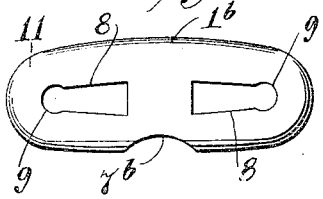 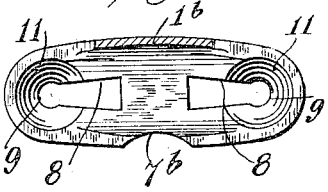
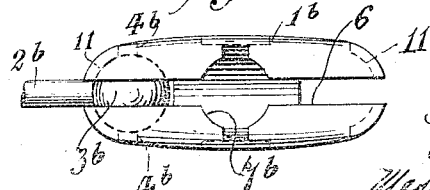
WITNESSES
INVENTOR
George F Long
BY
ATTORNEYS

UNITED STATES PATENT OFFICE.

GEORGE F. LONG, OF NEW YORK, N. Y.

FLEXIBLE SHAFT.

1,259,642.

Specification of Letters Patent. Patented Mar. 19, 1918.

Application filed August 16, 1912, Serial No. 715,327. Renewed May 8, 1917. Serial No. 167,368.

*To all whom it may concern:*

Be it known that I, GEORGE F. LONG, a citizen of the United States, residing in the borough of the Bronx, city of New York, and State of New York, have invented certain new and useful Improvements in Flexible Shafts, of which the following is a specification.

This invention relates to flexible shafting particularly of the kind used for speedometers of automobile and other vehicles.

The principal object of this invention is to provide a flexible shaft of simple construction composed of a plurality of detachable links, adapted to rotate within a flexible casing.

In carrying out my invention, a substantially tubular member or shell is provided which may be conveniently formed of a stamped blank of sheet metal. This shell is formed with an opening running longitudinally thereof into which is inserted the head of a link which is then slid along until the bearings register with corresponding bearings formed in the shell. The link is then turned into longitudinal alinement with the shell and the two are locked together although allowing a relative pivotal movement therebetween.

With the above construction the shaft is easily detachable and it is possible to retain the same inside of a casing owing to the exterior cylindrical surface of the shell which readily fits the interior of the casing.

Further objects and advantages will hereinafter appear.

In the accompanying drawing illustrating the preferred embodiments of this invention:—

Figure 1 is an elevation illustrating several sections or links of the improved shaft connected together.

Fig. 2 is an elevation of one of the connecting sections or links of the shaft.

Fig. 3 is a longitudinal sectional elevation of one of the shell members or links of the shaft, the section being taken on lines 3—3 of Fig. 4.

Fig. 4 is a sectional plan of the shell, the section being taken on line 4—4 on Fig. 3.

Fig. 5 is a sectional elevation and

Fig. 6 is a sectional plan of a modified form of shell.

Fig. 7 is an elevation of a modified form of connecting link.

Fig. 8 is an elevation and

Fig. 9 is a longitudinal section of still another form of shell.

Fig. 10 is a plan of the form of shell shown in Figs. 8 and 9 illustrated as connected with an adjacent link.

The flexible shaft is formed of a plurality of sections or links consisting of alternate shells 1 and connecting links 2 having heads 3 at the ends thereof engaging with and retained by these shells. The heads 3 of each link are disposed transversely to each other and are provided with cylindrical trunnions 4 which are cut away to form a flat face 5 presenting a reduced width of trunnions for the purpose hereinafter to be described. The shell consists of a substantially tubular member which may conveniently be formed of a stamped sheet metal blank and is provided with a longitudinal opening 6, the walls adjacent to the opening being notched at 7 at a point preferably mid length of the shell. A pair of slots 8 are formed in the shell adjacent to each end thereof, located substantially ninety degrees from the opening 6 and terminating in restricted openings communicating with apertures 9. The head 3 is inserted through the slot 6, the trunnions 4 passing through the notches 7, and is then slid along toward the end of the shell until the trunnions 4 register with the slots 8 and passing through the restricted passages, finally register with the apertures 9 as shown in dotted lines in Fig. 3. These passages are of sufficient width to admit the trunnions when inserted in the direction of their reduced width. When the connecting links are turned into alinement with the shells, the trunnions are locked in the apertures which form bearings therefor and restrain the links from longitudinal disengagement.

In the form of shell illustrated in Figs. 5 and 6, tongues 8ª are formed in slots 8 and are bent or sprung inward when the heads and trunnions of the connecting links pass the slots. The links are thus held permanently locked and cannot be detached unless the tongues are bent back.

In the modification illustrated in Figs. 7 to 10, the connecting link 2ᵇ has a spherical head 3ᵇ provided with trunnions 4ᵇ having a flat side 5ᵇ which trunnions are inserted through notches 7ᵇ formed in the shell 1ᵇ to correspond to the conformation of the head and trunnions. The ends of the shell are formed with spherical sockets 11 to seat the spherical heads. Otherwise the construction is similar to the construction illustrated in Figs. 1 to 4.

Although I have shown certain modifications it is obvious that various other changes and modifications within the skill of the mechanic may be made in the construction herein set forth and described without departing from the invention, provided the means set forth in the following claims be employed.

Having thus described my invention, I claim:

1. A flexible shaft composed of a plurality of sections, one of said sections consisting of a one piece hollow shell having oppositely disposed spaced side walls converging toward opposite ends and a bottom wall integral with said walls, said shell having bearings adjacent to its ends, said side walls forming therebetween an elongated longitudinal opening leading to said bearings, and another section having a head adapted to be inserted through said opening transversely of the shell at the wide portion thereof and movable into engagement with said bearings, said transverse movement of the head being limited by said bottom wall.

2. A flexible shaft composed of a plurality of sections, one of said sections consisting of a one piece shell having apertures adjacent to its extremities and slots leading to said apertures, there being a restricted opening between said slots and apertures, and another section having a head provided with cylindrical trunnions cut away on one side so as to be inserted through said restricted opening and to pass through said slots to be engaged in said apertures.

3. A flexible shaft composed of a series of alternate one-piece shells, and links having reduced extensions in the form of flat heads at their opposite ends and trunnions extending laterally from opposite flat faces of said heads connecting said shells and detachably journaled therein, said shells having longitudinal openings through one side into which the heads of the links are inserted, the heads at the ends of each link being disposed substantially ninety degrees from each other whereby the longitudinal openings of succeeding shells will be disalined.

4. A flexible shaft composed of a plurality of sections, one of said sections consisting of a shell of greater interior width at its mid length than at the ends thereof, having an opening extending longitudinally thereof and notches in the walls of said opening adjacent its mid length, said shell having also apertures adjacent its ends, and slots extending through said shell and leading to said apertures and extending into the wide portion of the shell, and a connecting section having trunnions adapted to be inserted through said notched opening and to pass through said slots to be engaged in said apertures.

5. A flexible shaft composed of a plurality of sections, one of said sections consisting of a shell of substantially circular transverse section having an opening extending longitudinally thereof and notches in the walls of said opening adjacent its mid length, said shell having also apertures adjacent its ends and slots leading to said apertures through restricted openings, and a connecting section having trunnions adapted to be inserted through said notched opening and to pass through said slots to be engaged in said apertures, said trunnions being flattened or reduced on one side to pass through the last mentioned openings.

6. A flexible shaft comprising a link having an opening extending longitudinally thereof, and having apertures formed at the ends thereof and slots leading from said apertures, a second link having bearings adapted to be inserted through said opening to pass through said slots into said apertures, and tongues adapted to extend inward from said slots to restrain the links from disengagement.

7. A flexible shaft composed of a plurality of sections, one of said sections consisting of a shell of substantially circular transverse section having an opening extending longitudinally thereof and notches in the walls of said opening adjacent its mid length, said shell having also apertures adjacent its ends, and slots leading to said apertures, and a connecting section having trunnions adapted to be inserted through said notched opening and to pass through said slots to be engaged in said apertures, there being inwardly projecting tongues adjacent said slots adapted to retain the links in engagement.

8. A flexible shaft composed of a plurality of sections, one of said sections consisting of a one piece hollow shell having oppositely-disposed side walls spaced unequal distances apart and a bottom wall integral with said side walls, said shell having bearings adjacent to its extremities, said side walls having apertures extending therethrough adjacent said bearings and another section having a head adapted to engage said bearings, and transversely-disposed trunnions, adapted to be inserted through said opening into the shell and adapted to be positioned in said apertures, said trunnions having a length at least equal to the distance between the side walls of the shell adjacent the apertures and less than the distance between the portion of the side walls intermediate the apertures.

9. A flexible shaft comprising a plurality of sections, one of said sections having the general form of a prolate spheroid and having an opening extending transversely thereof intermediate its length and a transversely disposed end bearing outlining one end of said opening, and another section having a head adapted to be inserted into said opening transversely of the length of the section, said head having a transverse extension adapted to engage said end bearing to retain said sections in engagement.

10. As an article of manufacture, an element adapted to form part of a flexible shaft, said element comprising a one-piece channel member, an end of said member having oppositely disposed walls and each of said walls having means formed therein and together forming a bearing spaced from the adjacent end of the member and adapted to receive a coacting element of the shaft, said channel member providing an opening leading to said bearing whereby the bearing engaging portion of the coacting element may be inserted through said opening and then moved longitudinally of the element onto said bearing.

11. As an article of manufacture, an element of a flexible shaft, comprising a one-piece hollow sheet metal stamping, similar bearings being formed in said member adjacent opposite ends and opening into the interior thereof, said member being formed with an opening in the side thereof leading to said bearings.

12. A flexible chain including two elements pivotally linked together, one of said elements comprising a channel shaped member with the sides spaced apart to form a longitudinally extending opening communicating with the interior thereof, a bearing formed in the member adjacent one end thereof and accessible from the interior of the member, the other comprising a body portion designed to slide along said longitudinally extending opening toward the bearing and a trunnion pin projecting from said body portion and designed to be contained within the channel member and to be seated in said bearing from the interior of the channel member.

This specification signed and witnessed this 8th day of August, A. D. 1912.

GEORGE F. LONG.

Signed in the presence of—
JOHN B. McCAW,
HARRY W. FANNING.

Copies of this patent may be obtained for five cents each, by addressing the "Commissioner of Patents, Washington, D. C."